United States Patent Office 3,156,663
Patented Nov. 10, 1964

3,156,663
PLASTICIZED ALKOXYLATED POLYVINYL ALCOHOL COMPOSITIONS
Philip L. Gordon, Lexington, Donald E. Dean, Fitchburg, and James L. Diedrich, Leominster, Mass., assignors to The Borden Company, New York, N.Y., a corporation of New Jersey
No Drawing. Filed May 12, 1961, Ser. No. 118,219
4 Claims. (Cl. 260—31.6)

This invention relates to plasticized alkoxylated polyvinyl alcohol compositions. The invention is particularly useful in making films for packaging detergents or the like from alkoxylated polyvinyl alcohol of wide range of viscosity and will be illustrated by description in connection with such use.

In making transparent film for packaging detergents including a desiccating salt, such as a partially or completely dehydrated sulfate or polyphosphate of sodium or like alkali metal, several difficulties arise. The film must be not so soft or weak as to tear during the moderate stretching to which edge portions of the film are subjected during heat sealing, as at about 380° F. The film should release itself satisfactorily from metal surfaces against which it may have been formed and be substantially non-coherent when the film is stacked in layers at ordinary temperatures. It must, on the other hand, be sufficiently pliable, i.e., non-brittle at the low temperatures to which it may be subjected occasionally during shipment or storage, as to resist fracture at such temperatures. Finally, the film must be soluble in water.

The invention comprises the herein described composition which shows this combination of needed properties and which includes alkoxylated polyvinyl alcohol blended with an alkoxylated partial ester of a higher fatty acid with a polyhydric alcohol.

The alkoxylated partial ester serving as the plasticizer gives a composition that is subject to cracking to an objectionable extent at low temperatures such as 0° F. when the films tested contain substantially more than 10% of the said ester on the weight of the resin. The difficulty is reduced, contrary to expectation, when the proportion of the plasticizing or flexibilizing agent is decreased, as to about 3%–6%. The low temperature cracking becomes seriously objectionable again when the amount of the partial ester is below about 2%.

Such proportion of the alkoxylated partial ester, which is exceptionally small for the plasticizer component in effectively plasticized alkoxylated polyvinyl alcohol, avoids the problem of water insolubility of compositions in which the plasticizer component is present in large proportion. It avoids objectionable dilution of the desirable properties of the alkoxylated polyvinyl alcohol.

Data illustrating the effect of various percentages of the alkoxylated partial ester plasticization on the weight of the alkoxylated polyvinyl alcohol are shown in the table below.

The polyvinyl alcohol here used is one which had initially the viscosity of 30 cps., represented polyvinyl acetate hydrolyzed to the extent of 98%–99% complete in making of the polyvinyl alcohol and had been ethoxylated to the extent of 20% of ethylene oxide on the weight of the alkoxylated product, the viscosity being stated here and elsewhere as that of a 4% aqueous solution at 68° F. The plasticizer used was sorbitan monolaurate ethoxylated to the extent of 20 moles of ethylene oxide for 1 mole of the monolaurate. The bags with the enclosed detergent were heat sealed, cooled to 0° F. and then shaken to test the resistance to rupture.

| Plasticizer, percent of alkoxylated polyvinyl alcohol: | Percent of bags ruptured on shaking at 0° F. |
|---|---|
| 0 | 100 |
| 1 | 58 |
| 2 | 59 |
| 2.5 | 50 |
| 3 | 33 |
| 4 | 33 |
| 5 | 8 |
| 6 | 42 |
| 7 | 67 |

It is noted that the least failures are found near the middle of the range of plasticizer content. The proportion of the plasticizer may be as low as 1% and as high as 10% when the films made therefrom are relatively thick or are to be used at temperatures not below 20° F. or not to be shaken severely.

To obtain the above and other cracking resistances herein, the following is the procedure used: The alkoxylated polyvinyl alcohol and the alkoxylated partial ester plasticizer were mixed in the water used to make the solution for film casting. The concentration of the solution used for casting of the film was 20 parts by weight of the alkoxylated polyvinyl alcohol, increased by the partial ester plasticizer in the proportion selected, for 100 parts of water. The solution was made at 185°–195° F. The solution was filtered to remove any foreign, undissolved material and allowed to stand 15 minutes for the separation of air bubbles. The solution was then cast on a polished steel plate maintained in horizontal position, to a wet layer of thickness of about 0.010–0.020 inch. The plate and the solution thereon was then warmed to 250° F. for approximately 10 minutes and the dried film stripped cold therefrom. The film of the composition stated released (parted) readily from the metal surface. The film was of thickness 0.0015–0.002 inch. It was trimmed into strips to be formed into packages. The packages were heat sealed on three sides.

The detergent packaged was a composition consisting essentially of any surfactant conventionally used as a detergent, e.g., the sodium salt of sulfonated octadecyl benzene or other sulfonated compound having a $C_{12}$–$C_{20}$ alkyl or alkenyl group therein or sulfated octadecyl or other higher alcohol, with approximately an equal weight or more of a moisture absorbing alkali metal salt detergent builder such as a substantially anhydrous sodium polyphosphate, e.g., tetrasodium pyrophosphate or sodium tripolyphosphate or anhydrous sodium sulfate and suitably both a phosphate and the sulfate. The detergent was filled into the open mouth of the package. Then an impulse heat sealer was applied, with the heating timer set for 1 second, the cooling timer 1 second, and the pressure 30 p.s.i. As the hot, pressing edges of this sealer first engaged and then forced and slightly pulled the edges of the package, moderate stretching conditions arose. After the bags were filled they were desiccated overnight at 120° F. and then overnight at 0° F. again under desiccating conditions, as over calcium chloride in a desiccator and in contact of the packaging material necessarily with the desiccating builder. The desiccation removes from the film moisture obtained from the atmosphere or otherwise, so as to avoid the influence of its plasticizing effect on the cracking test. The packages so formed, filled, sealed, desiccated and chilled were then shaken immediately on a conventional paint conditioner or shaker for a period of 3 minutes, with four bags to a quart fiber container secured on the shaker. The ruptures during the shaking operation, exaggerating the hazard of shipment and handling of the packages, were recorded as shown herein.

The polyvinyl alcohol used for the alkoxylation is any commercial grade such as one of viscosity 20 centipoises or higher. A suitable range is 50–100 and for best results 20–40 cps. measured as stated above. The degree of hydrolysis of the polyvinyl acetate represented by the polyvinyl alcohol made thereby is suitably within the 80%–100% complete. We ordinarily use the grade 96%–99%. The alkoxylation products of polyvinyl alcohol of varying viscosities and degrees of hydrolysis are beneficiated by the compounding therewith of the alkoxylated partial ester plasticizer.

The alkoxylating agent used is ethylene oxide. There may be used other lower alkylene oxides, however, such as isopropylene, n-propylene and any butylene oxide, that is, any $C_2$–$C_4$ alkylene oxide having an oxirane group therein.

The catalyst of esterification may be any alkaline catalyst of alkoxylation of polyvinyl alcohol, e.g., ammonia as in ammonium hydroxide solution or an aliphatic amine. Among the satisfactory amines are the mono-, di- and trialkanol amines having $C_2$–$C_4$ alkylene groups, as for example, the mono-, di- and triethanol amines. Other amines that may be used are those of the $C_1$–$C_8$ primary, secondary or tertiary alkyl amines that are water soluble, examples being diethylene, any dibutylene and dioctylene amine or the corresponding mono- or tri-substitution products of ammonia.

The plasticizer to be used is a water soluble alkoxylated partial ester of any $C_{12}$–$C_{20}$ monocarboxylic aliphatic acid with a water soluble polyhydric alcohol having 2–6 carbon atoms to the molecule. Examples of suitable acids for use in the esters are lauric, palmitic, oleic and stearic acid. Examples of suitable polyhydric alcohols are ethylene and other glycols, glycerine, pentaerythritol, sorbitol and any hexitan, e.g., 1,4-sorbitan. The proportion of the acid is at least a mole less than the amount which if used would be equivalent to all the hydroxy groups of the polyhydric alcohol or would cause the resulting ester, after alkoxylation, to be insoluble in water. A satisfactory commercial material is the sorbitan monolaurate alkoxylated to the extent of 20 moles of ethylene oxide for 1 mole of the monolaurate ("Tween 20"). The range of proportions of the alkylene oxide introduced into the polyvinyl alcohol is 5–50 parts of the oxide and suitably 15–50 parts for 100 parts of the resulting alkoxylated polyvinyl alcohol. Each mole of the alkylene oxide introduced leaves the residue thereof, i.e., a hydroxyalkyl group, in the partial ester.

There are used 1%–10% of the alkoxylated partial ester plasticizer and, for better results as to heat sealing and cracking resistance at low temperatures, 3%–6% of the weight of the resin.

The proportion of the catalyst of the alkoxylation is ordinarily about 0.2–4 parts for 100 parts of the polyvinyl alcohol. When the catalyst is ammonia, the amount on the anhydrous basis is usually in the lower part of the range stated. When the amines are used, either alone or in combination with the ammonium hydroxide, then the total catalyst used is higher, as within the range 1–4 parts.

We may and usually do introduce the plasticizer into polyvinyl alcohol that has been alkoxylated in advance, as in either the dry process or in suspension in a liquid non-solvent for the alcohol. Thus we pass ethylene oxide, for example, through a polyvinyl alcohol powder moistened with the catalyst, such as the combination of 1% of 28% ammonium hydroxide solution and 3% of triethanol amine on the weight of the said alcohol, at a temperature of about 60°–90° C., and 10–30 p.s.i., until the ethylene oxide is absorbed and reacted in the desired proportion. Then we may mix into the alkoxylated polyvinyl alcohol so made Tween 20 or other selected alkoxylated partial ester herein described, in the amount stated. In an alternative procedure, the powder so made by the dry process of alkoxylation may be dissolved in water in which the ester plasticizer is also dissolved, the solution so made being then ready for casting into film.

The alkoxylated partial ester plasticizer may be incorporated into the polyvinyl alcohol, alternatively, before the alkoxylation thereof is effected. Thus we may form a suspension of the polyvinyl alcohol powder and Tween 20 in hexane or other non-solvent suspending liquid and then pass in the ethylene oxide at the temperature and pressure and in the amount stated. The hexane or other non-solvent is distilled off. The resulting composition of alkoxylated polyvinyl alcohol and the alkoxylated partial ester plasticizer are recovered in bead form as the solvent is evaporated.

The invention will be further illustrated by description in connection with the following examples. In these examples and elsewhere herein proportions are expressed as parts by weight except where specifically stated to the contrary.

*Example 1*

100 parts of polyvinyl alcohol of viscosity 30 cps. representing polyvinyl acetate hydrolyzed to the extent of about 98%–99%, i.e., the 30/98 grade, and in the form of solid particles of size to pass to the extent of at least 90% by weight through a 140-mesh screen was mixed with 1.5 parts of 26% ammonium hydroxide solution and 3 parts of triethanol amine as catalysts. Ethylene oxide was then introduced into the resulting mixture at a pressure of about 20 p.s.i. gauge and the whole stirred continuously and maintained at a temperature of 75°–85° C. until the ethylene oxide had been absorbed in the amount of 32.7 parts corresponding to about 26% of the weight of the alkoxylated product. The product was obtained in the form of fine but somewhat enlarged particles.

*Example 2*

The final product of Example 1, that is the alkoxylated polyvinyl alcohol, was dissolved to a concentration of 20% in water at 85°–90° C. to which water had been added 4% of the Tween 20 plasticizer on the weight of the alkoxylated polyvinyl alcohol. The resulting solution was cast as a layer under a doctor blade spaced 0.2 inch above the steel plate on which the film was to be formed, the water evaporated from the layer at 120° C. and the resulting film stripped from the surface. The dried film was of thickness approximately 0.002 inch. At 70° F. it was substantially free from tack, objectionable softness, limpness, and coherence when stacked on itself. When cooled from room temperature down to 0° F., the film was still sufficiently flexible to withstand shaking without cracking.

When the proportion of the ethylene oxide in Example 1 was increased from 26% to 45%, the film made as described was crack resistant down to −10° F.

*Example 3*

The composition and procedure of Example 2 are used except that the alkoxylated sorbitan monolaurate there compounded is replaced by the other alkoxylated partial esters described herein, used in turn and in equal proportion by weight, as by ethylene glycol, glycerine, pentaerythritol and sorbitol monolaurate, monopalmitate, monooleate and mono-stearate and sorbitan monopalmitate, mono-oleate and mono-stearate, all ethoxylated to the extent of 20 moles of ethylene oxide for 1 mole of the partial ester.

*Example 4*

The procedure and composition of Examples 1 and 4 are used separately and in turn except that the 30/98 polyvinyl alcohol of that example is replaced by an equal weight of 60/98 polyvinyl alcohol.

The alkoxylated 60/98 polyvinyl alcohol is plasticized and made into a film as described in Example 2.

*Example 5*

The film is made by the procedure of Example 2, except that the alkoxylated polyvinyl alcohol and Tweens 20 are blended dry and later dissolved at the same time in water for film casting.

*Example 6*

Polyvinyl alcohol 100 parts, sorbitan monolaurate alkoxylated to have 20 moles of ethylene oxide for 1 mole of the monolaurate and 1% of ammonium hydroxide on the weight of the alcohol, are suspended in 100 parts of hexane. Ethylene oxide is then passed into the suspension under the conditions of temperature, pressure, time and stirring and in the amount stated in Example 1.

Then the hexane is distilled off at atmospheric pressure. The resulting mixture of alkoxylated polyvinyl alcohol and the alkoxylated sorbitan monolaurate are formed into film by the technique described.

It will be understood that it is intended to cover all changes and modifications of the examples of the invention herein chosen for the purpose of illustration which do not constitute departures from the spirit and scope of the invention.

We claim:
1. A plastic composition consisting essentially of a water soluble alkoxylated polyvinyl alcohol and a plasticizer compounded therewith, the plasticizer being a water soluble partial ester of a $C_{12}$–$C_{20}$ aliphatic monocarboxylic acid with a polyhydric alcohol, the said alcohol having 2–6 carbon atoms to the molecule, said ester having therein about 5–30 hydroxyalkyl groups for 1 mole of the ester and being in the proportion of about 1–10 parts by weight of the ester for 100 parts of the alkoxylated polyvinyl alcohol.
2. The composition of claim 1, the said partial ester being sorbitan monolaurate and the number of hydroxyalkyl groups therein being approximately 20 for 1 mole of the monolaurate.
3. The composition of claim 1, the said hydroxyalkyl groups being hydroxyethyl.
4. A film characterized by being non-coherent between stacked layers thereof at room temperature and non-cracking at 10° F. comprising the composition of claim 1 in the form of a film of thickness about 0.001–0.004 inch, said partial ester being ethoxylated sorbitan monolaurate.

References Cited in the file of this patent
UNITED STATES PATENTS

| | | |
|---|---|---|
| 1,867,117 | Tengler | July 12, 1932 |
| 1,971,662 | Schmidt | Aug. 28, 1934 |
| 2,333,624 | Altman | Nov. 9, 1943 |
| 2,351,301 | Sonnichsen | June 13, 1944 |
| 2,518,442 | Scheiderbauer | Aug. 15, 1950 |
| 2,842,514 | Bartlett et al. | July 8, 1958 |
| 2,844,570 | Broderick | July 22, 1958 |
| 2,850,471 | Klein | Sept. 2, 1958 |
| 2,908,650 | Fine | Oct. 13, 1959 |
| 3,010,930 | Schroeder et al. | Nov. 28, 1961 |